Oct. 30, 1945. R. A. SMITH 2,388,221
DEVICE FOR RECEIVING, RETAINING AND RELEASING ARTICLES
Filed Aug. 1, 1940 2 Sheets-Sheet 1

INVENTOR
Robert Armstrong Smith
BY
Brown & Jones
ATTORNEYS

Oct. 30, 1945. R. A. SMITH 2,388,221
DEVICE FOR RECEIVING, RETAINING AND RELEASING ARTICLES
Filed Aug. 1, 1940 2 Sheets-Sheet 2
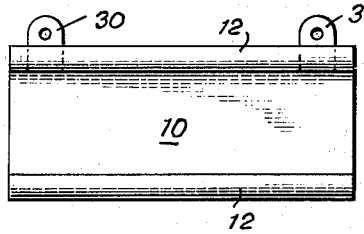
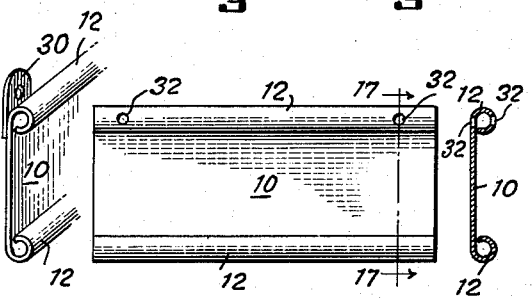
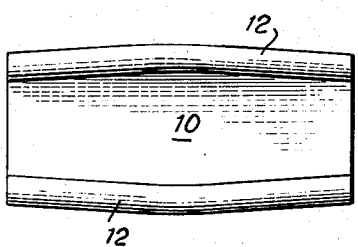
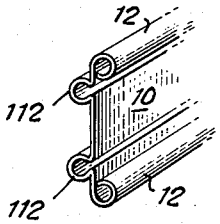
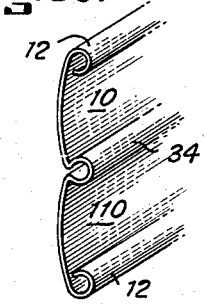
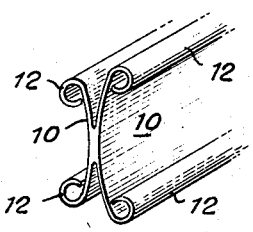
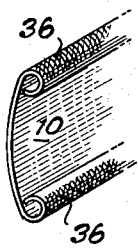
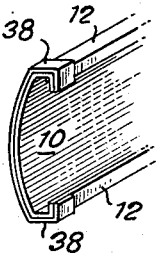
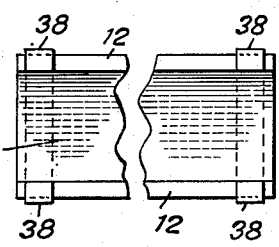
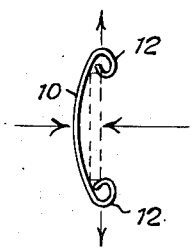
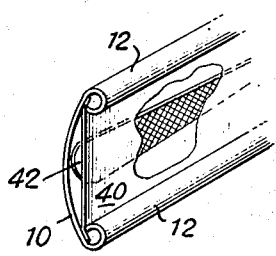
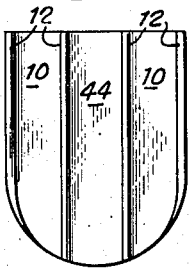
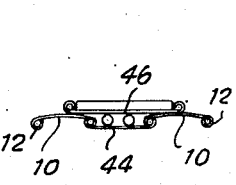
INVENTOR
Robert Armstrong Smith
BY
Brown & Jones
ATTORNEYS Patented Oct. 30, 1945

2,388,221

UNITED STATES PATENT OFFICE 2,388,221

DEVICE FOR RECEIVING, RETAINING, AND RELEASING ARTICLES

Robert Armstrong Smith, Mahwah, N. J.; Mary Gray Smith, Margaret Smith Pryde, and Mary Smith van Brederode, executrices of said Robert Armstrong Smith, deceased, assignor to Lewis W. Chubb, Jr., Sharon, Mass., as trustee Application August 1, 1940, Serial No. 349,068

2 Claims. (Cl. 133—6)

There are many needs for more convenient and inexpensive devices to receive, retain and release articles, and more especially for a simpler device which is portable and digitally operable, e. g., a coin holder.

In general, there is need of a device which will efficiently perform the purposes for which it is intended, which is simple and economical of construction, which can be expeditiously, conveniently and safely manipulated, and which can be readily manufactured.

It is often advantageous to find a small article and to obtain a sure grip thereon rapidly. There are many instances when one must use such an article as a coin, a lozenge or the like, at once. While some comparatively expensive and complicated devices have been available they are not in universal use and the desired result has not usually been obtained in the past when the article is to be searched for in a man's pocket or a woman's handbag. There are usually other small articles present which require a visual sorting out of the different article types. During this process some of the articles may be dropped, to the annoyance of the owner and to others, or a bus or other people delayed.

It is desirable to provide a coin holder or the like which resiliently but incompressibly (incompressibility used herein in the sense as of steel or plastics like Celluloid, but if desired in a springy form or shape) grips the coins, into and from which the coins may be snapped or slid, which may be operated by the fingers of one hand without the aid of the eyes, even by one untrained, and which does not become worn out except after a long period of many uses.

It is contemplated that at least one form of the present invention will be a device whereby one may insert one's hand into a handbag or pocket and immediately withdraw the precise type of article, for example a ten cent piece, which is to be used. Furthermore, the devices described herein operate with such facility that the articles may be inserted into them for retention and later used even though the article-holding device is out of sight in one's pocket or in a handbag.

The devices will frequently be of a durable material and form and, in accordance with the present invention, will not usually be destroyed by a single use nor become undesirably distorted after several uses. They may, if desired, be utilized for a long time.

For use in women's handbags or pocket-books they may be made as similar devices but with attachment holes or tabs, or special frameworks, if desired, to conveniently attach in the handbag, etc.

When these holding devices are made of metal or other hard material, it will be desirable to provide rounded or soft cushioned corners to prevent wear on the pocket. Usually this can be done simply by mechanical forming, or by buffing, etc., or by coating sufficiently with proper lacquers, etc.

In order to snap the coins in from the face it is convenient to have the edges in a partly cylindric or roll or curled form, not necessarily a complete cylinder, but somewhat rounded in part so the coin edge will enter and pass by easily and also be nipped and held at the coin edge when once in place.

This curling or folding of the edge will give some nip or grip on the coin simply from the edge shape itself, even though the back of the holder may be quite flat. As will be shown, it is very advantageous to arch or bow or shape otherwise than flat the back portion because, when the coin is in place, this arch or bow will aid in nipping or pinching the coin in place, yet, when the natural removal operation of the coin is performed, the pressure of the finger on the back of the arch or bow and the thumb on the coin will cause the edge rolls or curls to at least partially release the gripping pressure on the coin and thus further ease the removal.

The size of the edge rolls or curls, the thickness of the material, the amount of the arch or bow, and the width and length of the coin slots are to be made suitable for the coins or tokens or discs to be contained.

These various forms of coin holders may be made of steel, tempered if desired, by forming, rolling, pressing with dies, extrusion, etc., all as will be evident to the skilled worker. If of plastic, they may be formed from sheets or strips, or extruded, of such thickness and material as will be evident to the skilled worker.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which.

Figure 1:
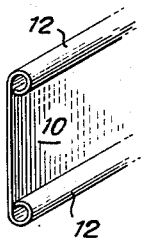
Figure 1 is a view of one end of a device embodying one form of the invention.
Figure 2:
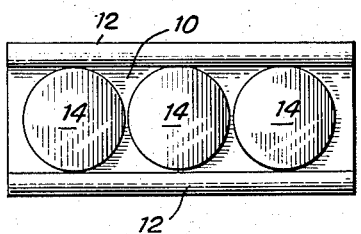
Fig. 2 is a view of the article-containing face of the device shown in Fig. 1.
Figure 10:
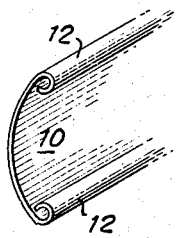
Figure 13:
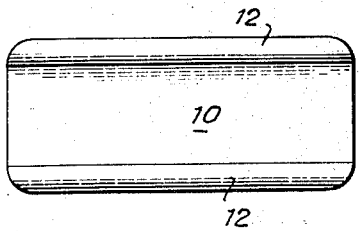

Figs. 3–12, similar to Fig. 1, show various forms of the various parts of the device shown in Fig. 1;

Fig. 13, similar to Fig. 2, shows a similar device with rounded corners;

Figs. 14 and 16 are face views of devices similar to that shown in Fig. 1 and provided with attaching means;

Figs. 15 and 17 are end views of the devices of Figs. 14 and 16, respectively;

Fig. 18 is a view, similar to Fig. 2, of a form of the device which has narrowed ends;

Figs. 19 to 21 are similar to Fig. 1 and show devices for holding articles of different sizes;

Fig. 22, similar to Fig. 1, shows a device with a specially treated surface;

Fig. 23, similar to Fig. 1, shows the device with an end-stiffening element;

Fig. 24 is a face view of the device shown in Fig. 23;

Fig. 25 is an end view illustrating the operation of the device;

Fig. 26, similar to Fig. 1, shows a device similar to Fig. 10 provided with a chamber;

Fig. 27 is a front view of a device for holding articles of various sizes and kinds; and Fig. 28 is an end view of the device shown in Fig. 27.

Any satisfactory material may be used in the manufacture of the devices described below. Metals and plastics have been found to be quite satisfactory.

In the drawings, 10 denotes the floor of a device embodying the invention, which device is generally trough-shaped with lateral parallel walls or flanges 12. These walls may be integral with and rolled up from the material of the floor. The coins 14 or other articles may be slid into place flat against the floor and with their rims nipped by the flanges 12 or, preferably, they may be snapped down between the flanges toward the floor. At least one end of the device is open whereby an article may be slid out by the gripping action of a thumb or finger. The material and shape of the device will usually provide sufficient resiliency that the flanges, which are at a distance from each other substantially equal to a dimension of the articles 14, grip those articles. The material, however, is not compressible to the extent that the articles permanently materially deform the material of the flanges but simply restrain it to conform to the shape of the article. The rolled flange operates satisfactorily because it presents a griping edge that is not too sharp and one which is at slightly varying distances from the opposite gripping edge whereby the two flanges are able to adapt themselves to small variations in the size of articles usually substantially of the same size.

Figures 3, 4:
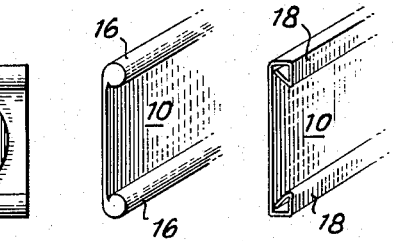
Figure 5:
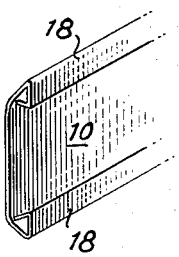
Figure 6:
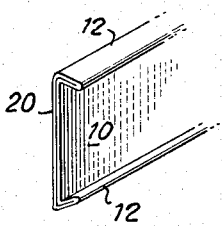
Figure 7:
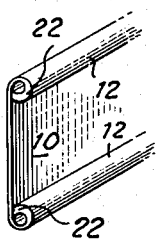

In some cases the articles to be carried may be heavy or rough or without resilience and it may be advisable to use flanges which do not have any hollow interior. In such case some resilience may be provided by the shape of the flange connection to the floor of the device. Such flanges 16 are shown in Fig. 3.

Figure 8:
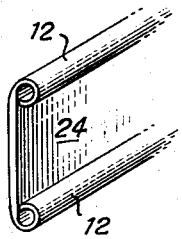

In other cases, a somewhat sharper edge along the flanges is desirable and the latter may be bent into the form of prismatic flanges 18 (see Figs. 4 and 5) which may be at various angles with the floor 10. In Fig. 4, the outer surface of the flange is substantially perpendicular to the floor 10. The material of the floor and/or flanges may be a sheet of material bent back upon itself to give a double layer 20 (see Fig. 6). This gives a somewhat stiffer device for a given thickness of material. The inner faces 22 of the flanges may be of thicker material than the remainder of the device (see Fig. 7). This thickness may be obtained by special forming, rolling, upsetting or extrusion. In Fig. 8 there is shown a device with a floor, back or bottom 24, which is thicker than the material of the flange. This, too, may be accomplished by proper rolling or extrusion. Figs. 9–12 illustrate a form which has been particularly happy. The back 10 in each case, or at least the material between the flanges, is in a form other than flat. This general joining of the back 10 assists in producing the nipping force between the flanges and a larger motion of the flanges is obtainable. The coins snap into place readily and they may be removed by pressing the back of the device toward the coin between the thumb and finger of one hand. When this is done, (see Fig. 25,) the device fulcrums on the edges of the coin, causing the flanges 12 to move away from the coin. Thus, the action itself is used to unlock the flanges which hold it. A relatively slight grip between the thumb and finger entirely releases the coin so that it may be slid off the end of the device to come to rest between the thumb and finger of the operator—immediately available for whatever purpose the operator has in mind.

Figure 9:
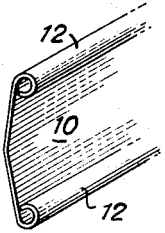
Figure 11:
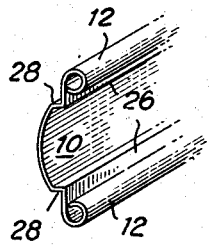
Figure 12:
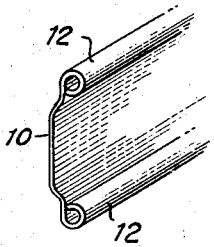

In Fig. 9, the back 10 has two portions at an angle to each other. In Fig. 10, the back is more simply arcuate. In Fig. 11, there are flat portions 26 of the back adjacent the flanges 12, the back being arched between the portions 26 with or without intervening portions 28 which are flat and effectively perpendicular to portions 26. The flat strips 26 provide a slightly firmer base for the coins retained but, like Figs. 9 and 10, the device of Fig. 11 does not have more than slight frictional resistance to the sliding of the coin as it is removed. Fig. 12 shows a device similar to that of Fig. 11 except that the very bottom 12 of the trough 10 is flat and not arcuate.

It is sometimes advisable to have the corners of the device lack sharp protuberances. Such a device may be obtained by bending the corners in upon themselves or coating or filling them with some smooth surfaced adhering material such as lacquer (see Fig. 13). Although it is not necessary to have the device attached to an object, nor to support the device, it is, however, convenient to have attaching means 30 fixed to the device, preferably at the side and against the bottom thereof, as shown in Figs. 14 and 15. The attaching means may be in the form of perforated tabs integral with or welded or otherwise attached to the device, which, by them, may be sewn into a handbag or fastened to a table. Apertures 32 may extend through the flanges in any direction to accommodate the securing means, such as nails, screws, pins or the like, as shown in Figs. 16 and 17. There are advantages in having the flanges near the ends of the device slightly closer to each other than the central portion of the device. This tends to insure that the articles will not be dispensed except at the will of the operator. Such a conformation is shown in exaggerated form in Fig. 18.

It is possible to use certain of the parts described above as common parts for a plurality of trough-like arrangements whereby articles of different shapes or dimensions may be retained by a single device. In Fig. 19, for example, the floor 10 has flanges 12 at a certain distance apart and at one side thereof. On the other face of the floor 10 there are other flanges 112, at a less distance apart, to hold smaller articles, and the parts 10, 12 and 112 are all formed from one continuous piece of material. In accordance with this principle, there may be manufactured a wholly different device in which a common flange 34 in rolled form is positioned between two arcuate floors 10 and 110. Coins may be held against either floor and between flange 34 and one of the outer flanges (see Fig. 20). Two trough-shaped arrangements may be joined back to back, as in Fig. 21, each with its own bottom 10 and its own flanges 12. The distance apart of the flanges may be different for one bottom than for the other.

The surface of the material of the device in some portion, for example area 36 of the flanges, may be prepared to act as a nail file (see Fig. 22). The ends of the device may be reinforced by stiffening element 38 which conforms to the device and surrounds the end of the same, as shown in Figs. 23 and 24.

There may be a false floor or liner 40 positioned over the usual arcuate floor 10 and providing therewith a chamber adapted for carrying articles, for example a nail file 42, as in Fig. 26.

The device may be adapted to sit on end in, and to conform to, the shape of a pocket and/or it may have a chamber for containing one or more pencils and/or a writing tablet. In Figs. 27 and 28 the holder has two trough-shaped units, each with a floor 10, each facing in the same direction, and spaced from each other. They are joined by a piece of material 44 which extends from a flange of one to a flange of the other and also by a piece of material 46 which extends from the back of the floor of one to the back of the floor of the other. These pieces are joined or connected at that end at which the units are closed. The space between these pieces is available for one or more pencils and/or a pad and/or other articles. The edges of the piece of material 46 may be curled backwards so as to retain an article there. The lower edge of the entire holder may be arcuate, the better to be inserted into and seat in a pocket—of a vest, for example. Any of these articles may be said to be between the trough-shaped units. The units may hold the same or different sized articles.

The operation of the device will be clear from a study of Fig. 25 in connection with what has been said above. These devices may be of steel, tempered, if desired, by forming, rolling, pressing the dies, extruding, etc. If made from plastic, they may be formed from sheets or strips or by extrusion.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A device for receiving, retaining and relinquishing coins having a predetermined dimension, said device comprising a trough-shaped element open at least at one end, said open end being at all times exposed, the material of said element being resilient, and the side portions of said element forming flanges, at a distance from each other slightly less than said dimension, each of said flanges being integral with the floor of said element and bent as a whole into a curl having its surface convex toward the curl of the opposite flange, whereby said coins may be inserted from the open face of said element and may be resiliently retained by and between said curls, and may be slid endwise for removal, and means for attaching said device to a support, the floor of said element being arcuate at least in part and having flattened portions adjacent said curls, whereby force on the back of said element toward a retained coin releases the pressure between said curls and the retained coin.

2. A device for receiving, retaining and relinquishing coins having a predetermined dimension, said device comprising a trough-shaped element open at least at one end, said open end being at all times exposed, the material of said element being resilient, and the side portions of said element forming flanges, at a distance from each other slightly less than said dimension, each of said flanges being integral with the floor of said element and bent as a whole into a curl having its surface convex toward the curl of the opposite flange, whereby said coins may be inserted from the open face of said element, and may be resiliently retained by and between said curls, and may be slid endwise for removal, the floor of said element being arcuate at least in part and having flattened portions adjacent said curls, whereby force on the back of said element toward a retained coin releases the pressure between said curls and the retained coin.

ROBERT ARMSTRONG SMITH.